(12) United States Patent
Raman et al.

(10) Patent No.: US 11,416,435 B2
(45) Date of Patent: Aug. 16, 2022

(54) FLEXIBLE DATAPATH OFFLOAD CHAINING

(71) Applicant: Pensando Systems, Inc., Milpitas, CA (US)

(72) Inventors: Pirabhu Raman, San Jose, CA (US); Tuyen Van Quoc, San Jose, CA (US); Paul Mathison, San Jose, CA (US); Mohankumar R. Tiruvayapadi, San Jose, CA (US)

(73) Assignee: PENSANDO SYSTEMS INC., Milpitas, CA (US)

( * ) Notice: Subject to any disclaimer, the term of this patent is extended or adjusted under 35 U.S.C. 154(b) by 0 days.

(21) Appl. No.: 16/559,381

(22) Filed: Sep. 3, 2019

(65) Prior Publication Data
US 2021/0064561 A1 Mar. 4, 2021

(51) Int. Cl.
*G06F 13/42* (2006.01)
(52) U.S. Cl.
CPC .. *G06F 13/4221* (2013.01); *G06F 2213/0026* (2013.01)
(58) Field of Classification Search
None
See application file for complete search history.

(56) References Cited

U.S. PATENT DOCUMENTS

| 4,394,733 | A | * | 7/1983 | Swenson | G06F 12/0866 711/216 |
| 4,425,615 | A | * | 1/1984 | Swenson | G06F 12/0866 711/114 |
| 5,778,436 | A | * | 7/1998 | Kedem | G06F 12/0862 711/122 |
| 6,675,263 | B2 | * | 1/2004 | Anderson | G06F 12/0862 711/137 |

(Continued)

FOREIGN PATENT DOCUMENTS

WO   WO-2021046102 A1   3/2021

OTHER PUBLICATIONS

PCT/US2020/049028 International Search Report and Written Opinion dated Nov. 30, 2020.

*Primary Examiner* — Henry Tsai
*Assistant Examiner* — Christopher A Bartels
(74) *Attorney, Agent, or Firm* — Wilson Sonsini Goodrich & Rosati

(57) ABSTRACT

Described are platforms, systems, and methods for processing a chain of operations through an input output (IO) subsystem without central processing unit (CPU) involvement. In one aspect, a computer-implemented method comprises: providing, via the CPU, the chain of operations to the IO subsystem, wherein the IO subsystem is coupled to the one or more processors over Peripheral Component Interconnect Express (PCIe); processing, with the IO subsystem, the chain of operations by: retrieving, from a memory, data associated with the chain of operations; executing each of (Continued)

the operations in the chain to determine an output based on the data and output determined for any prior executed operation in the chain; and providing the output of each the executed operations for execution of the respective next operation in the chain; and providing, via the IO subsystem, an output for the chain of operations to the CPU.

20 Claims, 5 Drawing Sheets

(56) References Cited

U.S. PATENT DOCUMENTS

| | | | |
|---|---|---|---|
| 7,181,572 B2* | 2/2007 | Walmsley | B41J 2/04505 |
| | | | 711/128 |
| 8,566,389 B2* | 10/2013 | Orady | H04L 67/42 |
| | | | 709/203 |
| 8,787,303 B2 | 7/2014 | Leung et al. | |
| 9,379,973 B2 | 6/2016 | Mekkattuparamban et al. | |
| 9,591,582 B1 | 3/2017 | Rabii et al. | |
| 2005/0050240 A1* | 3/2005 | Wilkins | G06F 3/0653 |
| | | | 710/15 |
| 2006/0136570 A1* | 6/2006 | Pandya | H04L 69/16 |
| | | | 709/217 |
| 2013/0097600 A1* | 4/2013 | Cardona | G06F 9/45558 |
| | | | 718/1 |
| 2013/0325998 A1* | 12/2013 | Hormuth | G06F 13/4027 |
| | | | 709/212 |
| 2015/0222533 A1* | 8/2015 | Birrittella | H04L 45/74 |
| | | | 370/392 |
| 2015/0370700 A1* | 12/2015 | Sabol | G06F 3/0617 |
| | | | 711/103 |
| 2016/0154756 A1* | 6/2016 | Dodson | G06F 13/4022 |
| | | | 710/316 |
| 2017/0187846 A1* | 6/2017 | Shalev | H04L 49/90 |
| 2017/0212784 A1* | 7/2017 | Johnsen | H04L 67/10 |
| 2018/0052632 A1* | 2/2018 | Takada | G11C 7/1078 |
| 2018/0089099 A1 | 3/2018 | Raj et al. | |
| 2018/0157539 A1 | 6/2018 | Agarwal et al. | |
| 2019/0102346 A1* | 4/2019 | Wang | G06F 16/90335 |
| 2021/0117360 A1* | 4/2021 | Kutch | G06F 9/5083 |
| 2021/0232528 A1* | 7/2021 | Kutch | G06F 9/45558 |

* cited by examiner

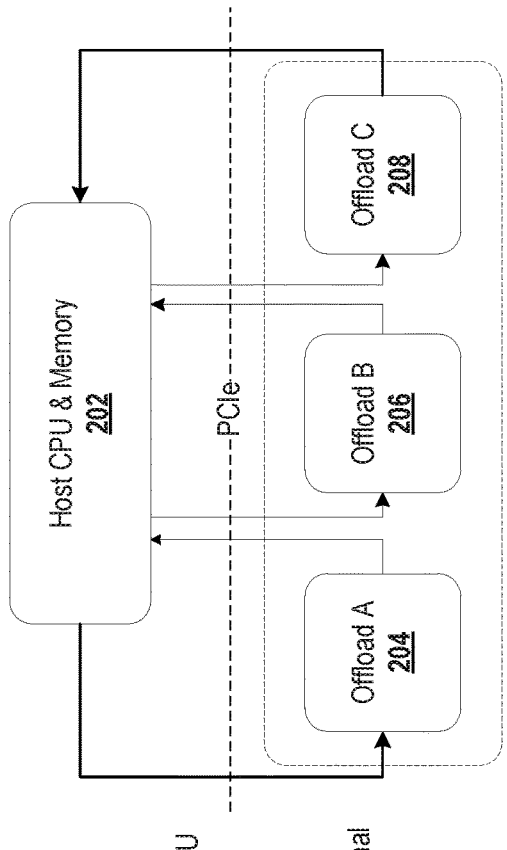
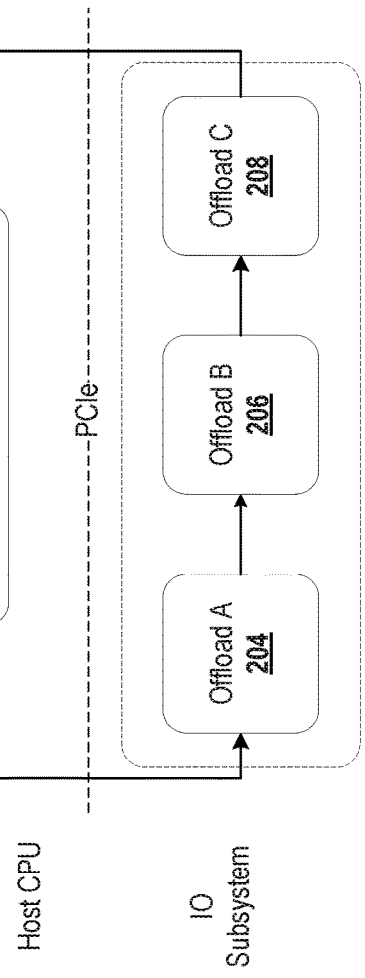

FLEXIBLE DATAPATH OFFLOAD CHAINING

BACKGROUND

Communications service providers are investing heavily in large and hyper-scale data centers to deliver content, data processing, and communications services. The applications delivering these services must have access to high-speed storage and networking, be secure, and run in a virtualized environment based on software-defined networking (SDN). Virtualization software, load balancing, encryption, deep packet inspection (DPI), and packet processing all require many central processing unit (CPU) cycles and can tie up multiple processor cores, reducing the number of cores available for applications.

SUMMARY

A Network Interface Card (NIC) is a Peripheral Component Interconnect Express (PCIe) expansion card that plugs into a server or storage box to enable connectivity to an Ethernet network. Traditional NICs support offload of CPU functions, such as checksum and segmentation. However, with the recent tectonic shift in cloud data center networking driven by SDN and network functions virtualization (NFV), a new class of offload NIC is needed. More specifically, the complexity of the server-based networking data plane has increased dramatically with the introduction of overlay tunneling protocols, such as virtual extensible local-area network (VXLAN), and virtual switching with complex actions. Additionally, increasing network interface bandwidths mean that performing these functions in software creates an untenable load on the CPU resources, leaving little or no CPU left over to run applications. Moreover, a key requirement of SDN is that the networking data plane must remain fungible, so fixed-function offload technologies cannot be applied.

A SmartNIC card (also known as an intelligent server adapter (ISA)) goes beyond simple connectivity, and implements network traffic processing on the NIC that would necessarily be performed by the CPU in the case of a foundational NIC. SmartNICs can be employed in cloud data center servers to boost performance by, for example, offloading operations of the CPUs of the servers by performing network datapath processing. SmartNIC cards offload low-level operations from server CPUs, dramatically increasing network and application performance. By installing smart NICs, communications service providers can deliver significantly better revenue-earning services with a small increase in investment.

Described herein, in certain embodiments, are a datapath offload chaining system that includes an IO Subsystem employed to offload low-level functions of a CPU. In some embodiments, an IO Subsystem includes a system on a chip (SOC) that may reside on a SmartNIC card. In some embodiments, an IO Subsystem provides hardware acceleration functions with a programmable pipeline. In some embodiments, the described datapath offload chaining system improves PCIe utilization and performance by providing for the offloading of operations to an IO Subsystem without CPU involvement. In some embodiments, the described datapath offload chaining system allows custom or programmable operations in the chain of operation, in addition to well-defined operations, and thus enables customizable datapaths that can be tailored to specific use cases. In some embodiments, the described datapath offload chaining system allows multiple types of chains to co-exist and each chain request to progress independently without serialization or head-of-line blocking. In some embodiments, the described datapath offload chaining system allows flexible sharing of offloads between lookaside and inline datapaths. In some embodiments, intermediate results needed for future operations are cached and operated locally within an IO Subsystem and are not fetched from host memory every time.

In one aspect, disclosed herein are datapath offload chaining systems comprising a memory; an input output (IO) subsystem; and one or more processors, wherein the IO subsystem is coupled to the one or more processors over PCIe, the one or more processors configured to: provide a chain of operations to IO subsystem; wherein the IO subsystem is configured to: process the chain of operations without involving the one or more processors by: retrieving, from the memory, data associated with the chain of operations; executing each of the operations in the chain to determine an output based on the data and output determined for any prior executed operation in the chain; and providing the output of each the executed operations for execution of the respective next operation in the chain; and providing an output for the chain of operations to the one or more processors. In some embodiments, the data is retrieved from the memory by the IO subsystem only once for processing the chain of operations. In some embodiments, the chain of operations comprises custom operations. In some embodiments, the chain of operations comprises previously defined operations. In some embodiments, the IO subsystem comprises a programmable application-specific integrated circuit (ASIC) engine. In some embodiments, a datapath for the chain of operations is not hardwired into an ASIC design of the ASIC engine. In some embodiments, the ASIC engine allows flexible sharing of offloads between lookaside and inline datapaths. In some embodiments, the ASIC engine comprises a plurality of offload engines. In some embodiments, the offload engines include a checksum engine, a dedupe engine, a compression engine, or an encryption engine. In some embodiments, the IO subsystem is configured to: determine at least one of the offload engines to perform the execution of each of the operations, wherein each of the operations is executed by the respective determined at least one of the offload engines. In some embodiments, the offload engines are flexibly shared between the processing of the chain of operations and processing of other chains of operations. In some embodiments, the data comprises at least one descriptor, and wherein the IO subsystem is configured to: before providing the output of each the executed operations for execution of the respective next operation in the chain, update the at least one descriptor according to the output. In some embodiments, the at least one descriptor comprises a size descriptor for the data, wherein the output of at least one of the operations changes a size of the data, and wherein the IO subsystem is configured to: update the size descriptor for the data based on the output of the at least one of the operations. In some embodiments, the IO subsystem is configured to: perform a transformation of the data according to the output of each of the operations. In some embodiments, the transformation comprises adding trailing data to the data. In some embodiments, the chain of operations comprises a chain of first operations and a chain of second operations, and wherein the IO subsystem is configured to: process the chain of first operations independently from the chain of second operations without any serialization or head-of-line blocking. In some embodiments, the data comprises a first set of data respective to the chain of first operations and a second set of data respective to the chain of second operations, and wherein the IO subsystem is configured to: join the first set of data with the second set of data at some point during the processing of the chain of operations. In some embodiments, the IO subsystem comprises a local memory and is configured to: persist the output determined for at least one of the operations in the chain to the local memory. In some embodiments, the IO subsystem is configured to: retrieve the output stored to the local memory when executing the next operation in the chain. In some embodiments, the chain of operations is dynamic and generated at runtime. In some embodiments, the IO subsystem is configured to: process chains of operations independently, wherein the processing of one chain of operations is not blocked by another chain of operations that started early. In some embodiments, the output for the chain of operations comprises an indication that the chain of operations has been processed and that the data has been updated according the output for each of the operations in the chain. In some embodiments, the IO subsystem comprises an expansion card.

In another aspect, disclosed herein are non-transitory computer-readable storage media coupled to one or more processors and an IO subsystem, the IO subsystem coupled to the one or more processors over PCIe; the one or more non-transitory computer-readable storage media having instructions stored thereon which, when executed by the one or more processors and the IO subsystem, cause the one or more processors and the IO subsystem to perform a method comprising: providing, via the one or more processors, a chain of operations to the IO subsystem; processing, with the IO subsystem, the chain of operations by: retrieving, from a memory, data associated with the chain of operations; executing each of the operations in the chain to determine an output based on the data and output determined for any prior executed operation in the chain; and providing the output of each the executed operations for execution of the respective next operation in the chain; and providing, via the IO subsystem, an output for the chain of operations to the one or more processors. In some embodiments, the data is retrieved from the memory by the IO subsystem only once for processing the chain of operations. In some embodiments, the chain of operations comprises custom operations. In some embodiments, the chain of operations comprises previously defined operations. In some embodiments, the IO subsystem comprises a programmable ASIC engine. In some embodiments, a datapath for the chain of operations is not hardwired into an ASIC design of the ASIC engine. In some embodiments, the ASIC engine allows flexible sharing of offloads between lookaside and inline datapaths. In some embodiments, the ASIC engine comprises a plurality of offload engines. In some embodiments, the offload engines include a checksum engine, a dedupe engine, a compression engine, or an encryption engine. In some embodiments, the IO subsystem is configured to: determine at least one of the offload engines to perform the execution of each of the operations, wherein each of the operations is executed by the respective determined at least one of the offload engines. In some embodiments, the offload engines are flexibly shared between the processing of the chain of operations and processing of other chains of operations. In some embodiments, the data comprises at least one descriptor, and wherein the IO subsystem is configured to: before providing the output of each the executed operations for execution of the respective next operation in the chain, update the at least one descriptor according to the output. In some embodiments, the at least one descriptor comprises a size descriptor for the data, wherein the output of at least one of the operations changes a size of the data, and wherein the IO subsystem is configured to: update the size descriptor for the data based on the output of the at least one of the operations. In some embodiments, the TO subsystem is configured to: perform a transformation of the data according to the output of each of the operations. In some embodiments, the transformation comprises adding trailing data to the data. In some embodiments, the chain of operations comprises a chain of first operations and a chain of second operations, and wherein the TO subsystem is configured to: process the chain of first operations independently from the chain of second operations without any serialization or head-of-line blocking. In some embodiments, the data comprises a first set of data respective to the chain of first operations and a second set of data respective to the chain of second operations, and wherein the TO subsystem is configured to: join the first set of data with the second set of data at some point during the processing of the chain of operations. In some embodiments, the TO subsystem comprises a local memory and is configured to: persist the output determined for at least one of the operations in the chain to the local memory. In some embodiments, the TO subsystem is configured to: retrieve the output stored to the local memory when executing the next operation in the chain. In some embodiments, the chain of operations is dynamic and generated at runtime. In some embodiments, the TO subsystem is configured to: process chains of operations independently, wherein the processing of one chain of operations is not blocked by another chain of operations that started early. In some embodiments, the output for the chain of operations comprises an indication that the chain of operations has been processed and that the data has been updated according the output for each of the operations in the chain. In some embodiments, the TO subsystem comprises an expansion card.

In another aspect, disclosed herein are computer-implemented methods for processing a chain of operations through an TO subsystem without CPU involvement comprising: providing, via the CPU, the chain of operations to the TO subsystem, wherein the TO subsystem is coupled to the CPU over PCIe; processing, with the TO subsystem, the chain of operations by: retrieving, from a memory, data associated with the chain of operations; executing each of the operations in the chain to determine an output based on the data and output determined for any prior executed operation in the chain; and providing the output of each the executed operations for execution of the respective next operation in the chain; an providing, via the TO subsystem, an output for the chain of operations to the CPU. In some embodiments, the data is retrieved from the memory by the TO subsystem only once for processing the chain of operations. In some embodiments, the chain of operations comprises custom operations. In some embodiments, the chain of operations comprises previously defined operations. In some embodiments, the IO subsystem comprises a programmable ASIC engine. In some embodiments, a datapath for the chain of operations is not hardwired into an ASIC design of the ASIC engine. In some embodiments, the ASIC engine allows flexible sharing of offloads between lookaside and inline datapaths. In some embodiments, the ASIC engine comprises a plurality of offload engines. In some embodiments, the offload engines include a checksum engine, a dedupe engine, a compression engine, or an encryption engine. In some embodiments, the IO subsystem is configured to: determine at least one of the offload engines to perform the execution of each of the operations, wherein each of the operations is executed by the respective determined at least one of the offload engines. In some embodiments, the offload engines are flexibly shared between the processing of the chain of operations and processing of other chains of operations. In some embodiments, the data comprises at least one descriptor, and wherein the IO subsystem is configured to: before providing the output of each the executed operations for execution of the respective next operation in the chain, update the at least one descriptor according to the output. In some embodiments, the at least one descriptor comprises a size descriptor for the data, wherein the output of at least one of the operations changes a size of the data, and wherein the IO subsystem is configured to: update the size descriptor for the data based on the output of the at least one of the operations. In some embodiments, the IO subsystem is configured to: perform a transformation of the data according to the output of each of the operations. In some embodiments, the transformation comprises adding trailing data to the data. In some embodiments, the chain of operations comprises a chain of first operations and a chain of second operations, and wherein the IO subsystem is configured to: process the chain of first operations independently from the chain of second operations without any serialization or head-of-line blocking. In some embodiments, the data comprises a first set of data respective to the chain of first operations and a second set of data respective to the chain of second operations, and wherein the IO subsystem is configured to: join the first set of data with the second set of data at some point during the processing of the chain of operations. In some embodiments, the IO subsystem comprises a local memory and is configured to: persist the output determined for at least one of the operations in the chain to the local memory. In some embodiments, the IO subsystem is configured to: retrieve the output stored to the local memory when executing the next operation in the chain. In some embodiments, the chain of operations is dynamic and generated at runtime. In some embodiments, the IO subsystem is configured to: process chains of operations independently, wherein the processing of one chain of operations is not blocked by another chain of operations that started early. In some embodiments, the output for the chain of operations comprises an indication that the chain of operations has been processed and that the data has been updated according the output for each of the operations in the chain. In some embodiments, the IO subsystem comprises an expansion card.

BRIEF DESCRIPTION OF THE DRAWINGS

A better understanding of the features and advantages of the present subject matter will be obtained by reference to the following detailed description that sets forth illustrative embodiments and the accompanying drawings of which:

FIGS. 2A-2C depict non-limiting example embodiments of offload chaining of operations;

DETAILED DESCRIPTION

Figure 1:
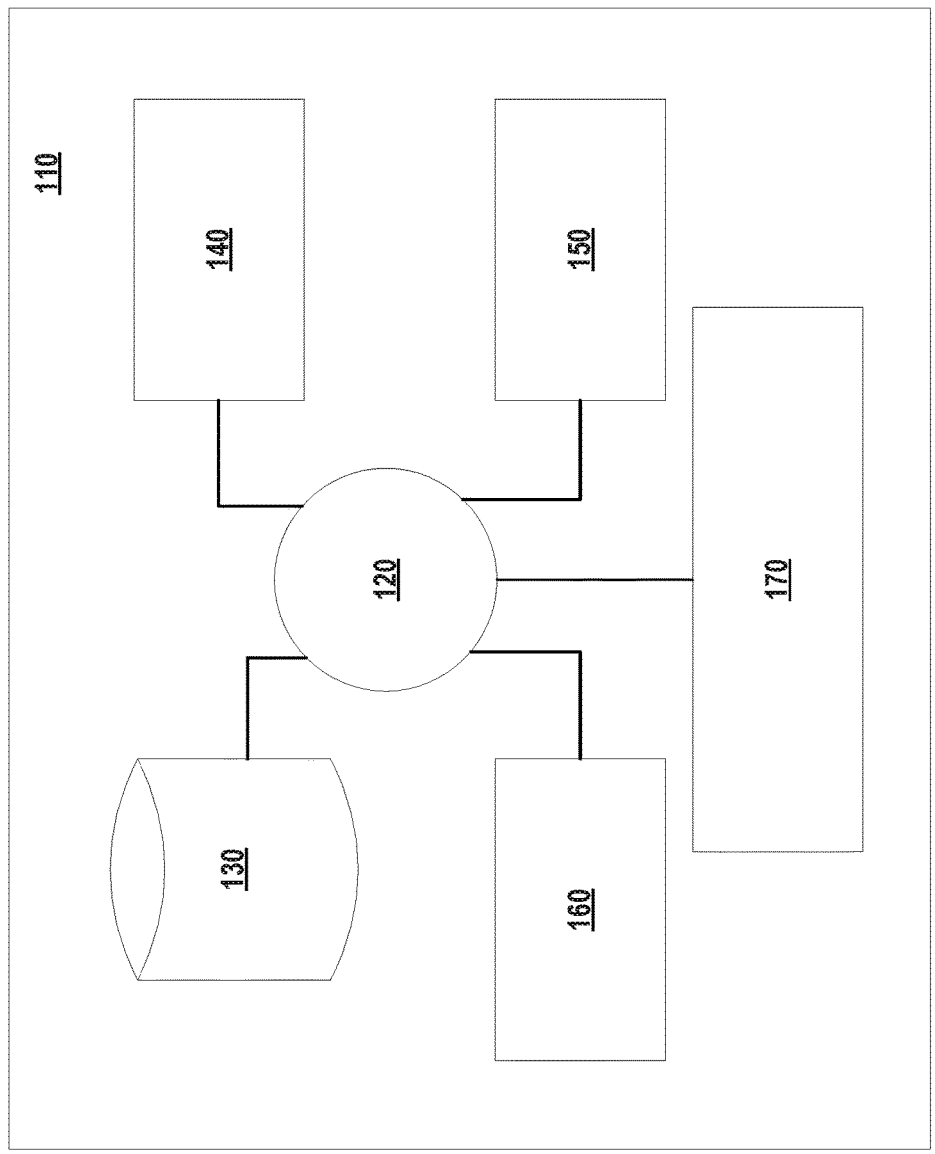
FIG. 1 depicts a non-limiting example computer system that can be programmed or otherwise configured to implement methods or systems of the present disclosure.
Figure 1:
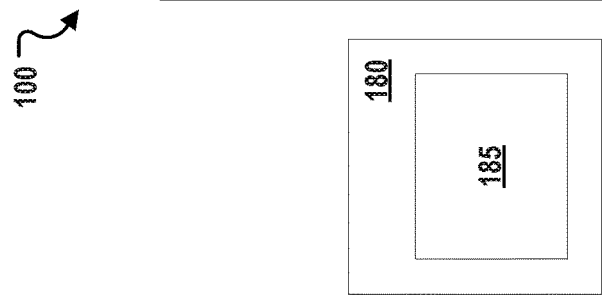

Described herein, in certain embodiments, are datapath offload chaining systems comprising a memory; an IO subsystem; and one or more processors, wherein the IO subsystem is coupled to the one or more processors over PCIe, the one or more processors configured to: provide a chain of operations to IO subsystem; wherein the IO subsystem is configured to: process the chain of operations without involving the one or more processors by: retrieving, from the memory, data associated with the chain of operations; executing each of the operations in the chain to determine an output based on the data and output determined for any prior executed operation in the chain; and providing the output of each the executed operations for execution of the respective next operation in the chain; and providing an output for the chain of operations to the one or more processors.

Also described herein, in certain embodiments, are non-transitory computer-readable storage media coupled to one or more processors and an IO subsystem, the IO subsystem coupled to the one or more processors over PCIe; the one or more non-transitory computer-readable storage media having instructions stored thereon which, when executed by the one or more processors and the IO subsystem, cause the one or more processors and the IO subsystem to perform a method comprising: providing, via the one or more processors, a chain of operations to the IO subsystem; processing, with the IO subsystem, the chain of operations by: retrieving, from a memory, data associated with the chain of operations; executing each of the operations in the chain to determine an output based on the data and output determined for any prior executed operation in the chain; and providing the output of each the executed operations for execution of the respective next operation in the chain; and providing, via the IO subsystem, an output for the chain of operations to the one or more processors.

Also described herein, in certain embodiments, are computer-implemented methods for processing a chain of operations through an IO subsystem without CPU involvement comprising: providing, via the CPU, the chain of operations to the IO subsystem, wherein the IO subsystem is coupled to the CPU over PCIe; processing, with the IO subsystem, the chain of operations by: retrieving, from a memory, data associated with the chain of operations; executing each of the operations in the chain to determine an output based on the data and output determined for any prior executed operation in the chain; and providing the output of each the executed operations for execution of the respective next operation in the chain; an providing, via the IO subsystem, an output for the chain of operations to the CPU.

Certain Definitions

Unless otherwise defined, all technical terms used herein have the same meaning as commonly understood by one of ordinary skill in the art to which this disclosure belongs.

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

As used herein, the term "real-time" refers to transmitting or processing data without intentional delay given the processing limitations of a system, the time required to accurately obtain data and images, and the rate of change of the data and images. In some examples, "real-time" is used to describe the presentation of information obtained from components of embodiments of the present disclosure.

As used herein, PCIe includes a high-speed serial computer expansion bus standard. In some examples, PCIe is a motherboard interface for hardware components, such as, graphics cards, hard drives, solid-state drives (SSDs), Wi-Fi and Ethernet hardware connections. PCIe is based on point-to-point topology, with separate serial links connecting every device to the root complex (host). PCIe has improvements over the older standards (e.g., Peripheral Component Interconnect (PCI), PCI eXtended (PCI-X) and Accelerated Graphics Port (AGP) bus standards), including higher maximum system bus throughput, lower input output (I/O) pin count and smaller physical footprint, better performance scaling for bus devices, a more detailed error detection and reporting mechanism (e.g., Advanced Error Reporting, (AER)), and native hot-swap functionality. More recent revisions of the PCIe standard provide hardware support for I/O virtualization.

As used herein, an expansion card includes a printed circuit board that can be inserted into an electrical connector, or expansion slot, on a computer motherboard, backplane or riser card to add functionality to a computer system via an expansion bus. In some embodiments, an expansion bus is a computer bus that moves information between the internal hardware of a computer system, such as the CPU and random access memory (RAM), and peripheral devices such as cache, other memory, data storage or electronic display adapters.

As used herein, operations include compression, decompression, encryption, decryption, hash digest computation (dedupe), checksum, and so forth. In some embodiments, these operations also perform "generic" work, such as fetch, decode and execute.

As used herein, a chain of operations include a combination or a sequence of operations. For example, compress plus encrypt, decrypt plus decompress, checksum plus encrypt plus checksum, and hash plus compress plus pad plus hash.

As used herein, a datapath includes a collection of functional units, such as arithmetic logic units or multipliers, that perform data processing operations, registers, and buses. A larger datapath can be made by joining more than one number of datapaths using multiplexer. In some embodiments, offload chaining within a datapath provides for increased processing throughput. For example, a SmartNIC may have a 100 Gigabits per second (Gbps) PCIe data path which, if not properly employed by, for example, a host operating system, would not achieve the full 100 Gbps throughput. The counterpart of a datapath is the control path, which may execute on a host CPU and, as such, would not be able to reach the 100 Gbps throughput. In some embodiments, the described datapath offload chaining system is employed to provide the hardware acceleration with a programmable pipeline to achieve this 100 Gbps data processing throughput.

In some embodiments, computer system employing the described datapath offload chaining system improve performance through performing selective redirects or forks in the middle of a chain of operations based on results of a previous operations in the chain, rate-limiting across simple and complex chains, and more efficient batching of operations. In some embodiments, selective redirects include the system ability to make decisions at runtime based on the output of each operation. For example, the system can follow a first path when an operation succeeds or second path when the operation fails. In such an example, the second path may include skipping ahead based on the failure of the operation. In some embodiments, the described datapath offload chaining system reduced latency as compared to a conventional device due to fewer PCIe round-trips.

In some embodiments, rate-limiting refers to the Gbps PCIe bandwidth (as described above). In some embodiments when the described system engages rate limiting during offload chaining, scheduling opportunities are purposefully reduces in the programmable pipeline for its data path, so as to not consume all of the Gbps bandwidth and to leave the remaining bandwidth for other functions in the SmartNIC, such as Remote Direct Memory Access (RDMA).

In some embodiments, the scope of intermediate results that are not needed after further operations are limited to local memory only. In some embodiments, described datapath offload chaining system can provide copies of intermediate results to application as needed. In some embodiments, the described datapath offload chaining system allows for custom operations that can be programmed and invoked through programmable pipeline. Non limiting examples as such custom operations include: padding output of operation of to specific boundary before invoking next operation (e.g., pad zeros), truncating output of operation of to specific boundary before invoking a next operation, and adding custom header or trailer to out-of-specific operation before invoking a next operation.

Computer systems are provided herein that can be used to implement methods or systems of the disclosure. FIG. 1 depicts an example a computer system 100 that can be programmed or otherwise configured to implement methods or systems of the present disclosure. For example, the computing device 110 can be programmed or otherwise configured to provide chains of operations through the CPU 120 for processing by the IO subsystem 170. As depicted, the computer system 100 includes a computing device 110 and an optional electronic display 180.

In the depicted embodiment, the computing device 110 includes a CPU (also "processor" and "computer processor" herein) 120, which is optionally a single core, a multi core processor, or a plurality of processors for parallel processing. The computing device 110 also includes memory or memory location 130 (e.g., random-access memory, read-only memory, flash memory); electronic storage unit 140 (e.g., hard disk); communication interface 150 (e.g., network adapter) for communicating with one or more other systems; peripheral devices 160 (e.g., cache, other memory, data storage or electronic display adapters), and IO subsystem 170 (e.g., an expansion card, such as a SmartNIC card). The memory 130, the electronic storage unit 140, the communication interface 150, the peripheral devices 160, and the IO subsystem 170 are in communication with the CPU 120 through a communication bus (solid lines), such as a motherboard.

In some embodiments, the CPU 120 can execute a sequence of machine-readable instructions, which can be embodied in a program or software. The instructions may be stored in a memory location, such as the memory 130. The instructions can be directed to the CPU 120, which can subsequently program or otherwise configure the CPU 120 to implement methods of the present disclosure. Examples of operations performed by the CPU 120 can include fetch, decode, execute, and write back. In some embodiments, the CPU 120 is part of a circuit, such as an integrated circuit. One or more other components of the computing device 110 can be optionally included in the circuit. In some embodiments, the circuit is an ASIC or a Field Programmable Gate Array (FPGA).

In some embodiments, the IO subsystem 170 comprises an expansion card, such as a SmartNIC card, that is connected with the CPU 120 via PCIe. In some embodiments, the IO subsystem 170 is completely programmable ASIC engine. In some embodiments, an ASIC engine is tailored to a specific subset of functions, such as compression and checksum, while another engine is dedicated for symmetric cryptography. Such embodiments provide for flexibility with datapaths in that each datapath does not have to be hardwired into the ASIC design. For example, the execution of the operations can change during runtime to take on a new form. In some embodiments, the IO subsystem 170 includes multiple offload engines. Non limiting example of offload engines include: a checksum engine, a dedupe engine, a compression engine, an encryption engine, and so forth.

In some embodiments, the IO subsystem 170 offloads a sequence or chain of operations without involvement of the CPU 120. In some embodiments, the IO subsystem 170 retrieves data associated with the chain of operations from memory 130 once and operates locally (e.g., by employing local memory) and thus reduces pressure (e.g., load) on PCIe. See the descriptions of FIGS. 2A-2C below for more details regarding the processing of operations with the described datapath offload chaining system via an IO subsystem, such as IO subsystem 170.

In some embodiments, the electronic storage unit 140 includes a data storage unit (or data repository) for storing data. In some embodiments, the electronic storage unit 140 stores files, such as drivers, libraries, images, and saved programs. In some embodiments, the electronic storage unit 140 stores user data, e.g., user preferences and user programs. In some embodiments, the computing device 110 includes one or more additional data storage units that are external, such as located on a remote server that is in communication through an intranet or the internet.

Figure 3:
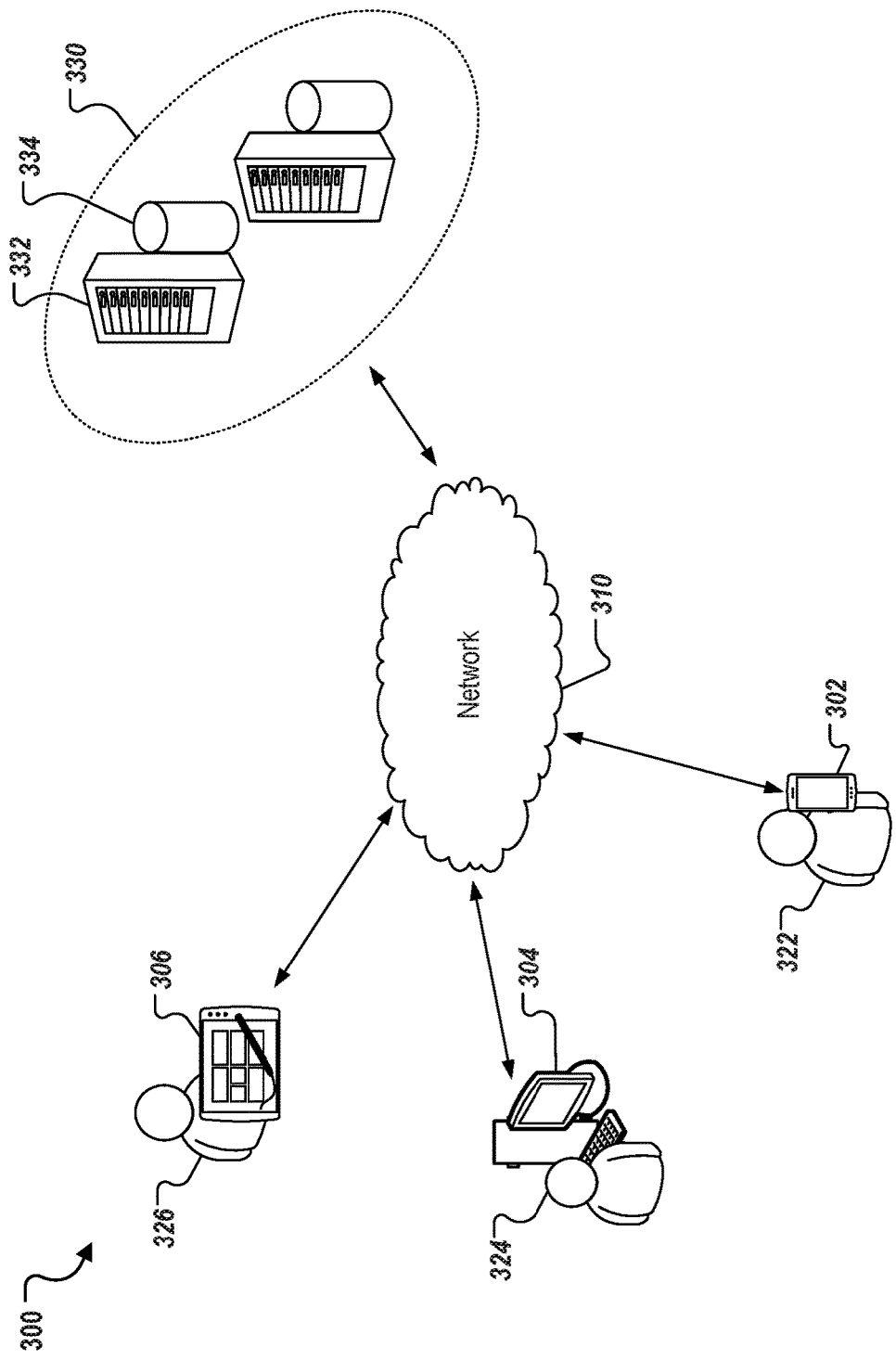
FIG. 3 depicts a non-limiting example environment where implementations of the present disclosure can be employed.

The computing device 110 is optionally operatively coupled to a network, such as the network 310 depicted and described in FIG. 3, with the aid of the communication interface 150. In some embodiments, the computing device 110 communicates with one or more remote computer systems through the network. Examples of remote computer systems include personal computers (e.g., portable PC), slate or tablet PCs (e.g., Apple® iPad, Samsung® Galaxy Tab, etc.), smartphones (e.g., Apple® iPhone, Android-enabled device, Blackberry®, etc.), or personal digital assistants. In some embodiments, a user can access the computing device 110 via a network.

In some embodiments, methods as described herein are implemented by way of machine (e.g., computer processor) executable code stored on an electronic storage location of the computing device 110, such as, for example, on the memory 130 or the electronic storage unit 140. In some embodiments, the CPU 120 is adapted to execute the code. In some embodiments, the machine executable or machine readable code is provided in the form of software. In some embodiments, during use, the code is executed by the CPU 120. In some embodiments, the code is retrieved from the electronic storage unit 140 and stored on the memory 130 for ready access by the CPU 120. In some situations, the electronic storage unit 140 is precluded, and machine-executable instructions are stored on the memory 140. In some embodiments, the code is pre-compiled. In some embodiments, the code is compiled during runtime. The code can be supplied in a programming language that can be selected to enable the code to execute in a pre-compiled or as-compiled fashion.

In some embodiments, the computing device 110 can include or be in communication with the electronic display 180. In some embodiments, the electronic display 180 provides a user interface (UI) 185.

Figure 2C:
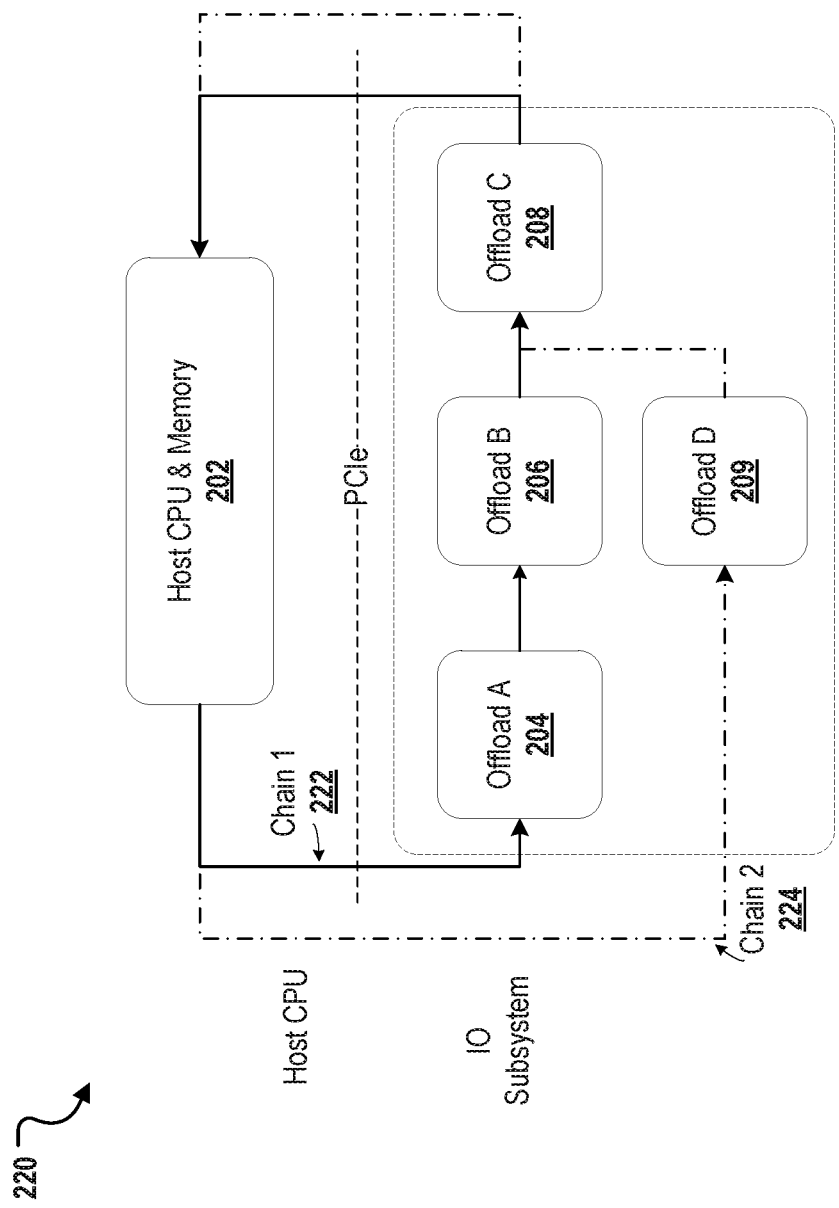

FIGS. 2A-2C depict example embodiments of offload chaining of operations by, for example, a CPU, such as CPU 120 of FIG. 1, with data accessed and store within a memory, such as memory 130, of FIG. 1 (Host CPU and Memory 202). The example embodiments depict three or four offload operations engines (offload A 204, offload B 206, offload C 208, and offload D 209) for simplicity and example purposes. Any number of operation engines (typically many more than three or four) can be employed within the described datapath offload chaining system to process offloaded operations. FIG. 2A depicts an embodiment 200 of how a CPU may offload operations through a conventional device while FIGS. 2B and 2C depict examples embodiments 210 and 220, respectively, of how a CPU may offload operations by employing the described datapath offload chaining system via an IO subsystem, such as IO subsystem 170 of FIG. 1.

As depicted in FIG. 2A, the host CPU 202 is involved in chaining and handoff of output from one offload operation to next offload operation. As depicted the host CPU 202 provides data over PCIe to a conventional card and receives the results (e.g., output) after each offload engine (offload A 204, offload B 206, and offload C 208) process an offloaded operation. The CPU repeats the sending and receiving of data and results for each operation. Such a process calls the PCIe multiple times where each call uses PCIe bandwidth, which is inefficient.

As depicted in FIG. 2B, however, by employing the described datapath offload chaining system via an IO subsystem, such as the IO subsystem 170 depicted in FIG. 1, the host CPU 202 operations can be flexibly combined in any combination without involvement by the host CPU 202. As depicted, the host CPU 202 provides an entire chain of operations (e.g., based on an application that is running on the host CPU 202) to an IO Subsystem and the data associated with the chain of operations is provided/retrieved once over PCIe. As depicted in FIG. 2B, an IO subsystem within the described datapath offload chaining system can chain the provided operations through a flexible programmable engine and employs the intelligence to pass information from one operation to the next as each is processed or completed.

Moreover, in some embodiments as the IO subsystem checks the data between operations, a determination can be made whether any descriptors for the data need to be changed. In some embodiments, these descriptors include input parameters for the operations, such as the location of input data, the location for output data, the specific type of operation to be performed, and so forth. In some embodiments, the IO subsystem makes such changes to any descriptors as needed. As an example, if an operation transforms the data (e.g., the data has a new size or length), the IO subsystem can determine that this has happened and pass along the information (e.g., the new size or length of the data) to the next offload engine (e.g., offload B). In some embodiments, the IO subsystem may transform the data (e.g., add trailing data). In some embodiments, after the completion of an operation, the flexible programmable engine employed by the IO subsystem reads the descriptors to determine the chain that the operation is included within and determines whether there are updates for any descriptors or new descriptions needed for the next operation. For example, the flexible programmable engine can modify the descriptor for offload B 206 (if necessary) to provide information about the output from offload A 204. In some embodiments, the chaining of operations includes, for example, updating changing the size of data for next service in chain, zero padding the output data from previous service in the chain to the next service, and so forth. In some embodiments, the chaining of operation includes a 'bypass on fail' where when a service in the chain fails, the chain of operations can proceed. For example, in the case of 'compression plus checksum' if compression fails, the operation of getting checksum on the original uncompressed buffer can be carried out.

In some embodiment, IO subsystem employs flexible sharing where the offload engines (e.g., offload A, B and C 204-208) can be shared across various chains or operations. In some embodiments, flexible sharing includes sharing engines between lookaside and inline operations. For example, with more than one cryptographic engine in the IO subsystem, the pipeline can be programmed to use one cryptographic engine for lookaside encryption, another cryptographic engine for lookaside decryption, and yet another cryptographic engine for inline encryption, and so forth. In some embodiments, the choice of which engine for a particular function is not hardwired and can be flexibly changed by reprogramming the pipeline. In some embodiments, another form of flexible sharing allows multiple processors or processor cores to use the same offload engine (e.g., compression) at the same time without requiring an operating system locking construct. In some embodiments, offload requests received from these processors are sent by the described datapath offload chaining system to the shared engine in an orderly and atomic fashion without causing inadvertent operation overwrite in that shared engine.

In some embodiments, output from one operation engine is placed in a local memory on the IO subsystem for the next operation engine to use when processing the next operation in the chain. The use of such local memory on the IO subsystem provides a much more efficient and faster process than, for example, sending the output back to the host CPU 202 where it would be, for example, written to host memory.

The example embodiment 220 depicted in FIG. 2C depicts includes two independent chains of operations: chain 1 222 and chain 2 224 and shows that multiple chains can be active at the same time within the described datapath offload chaining system. The depicted example embodiment 220 shows each chain progresses independently are not blocked by chains that started early within the IO subsystem. In the example depicted, chain 2 224 moves to offload C 208 when ready even when chain 1 222 started before chain 2 224 and is waiting on offload A 204 or offload B 206 to complete. The example embodiment 220 also shows how the described datapath offload chaining system can handle or track a data element going through one chain (e.g., chain 1 222) and another data element through another chain (e.g., chain 2 224), and then join the data elements at some point (e.g., at offload C 208). The embodiments 200, 210, and 220 are provided as non-limiting examples of the chaining of operations within the described datapath offload chaining system. It is contemplated, however, that implementations of the present disclosure can be realized with other typed and lengths of chains of operation processed through the described system. Such chains may not be fixed but rather dynamic and generated at runtime based as required on the types of operations provided by the CPU.

FIG. 3 depicts an example environment 300 that can be employed to execute implementations of the present disclosure. The example system 300 includes computing devices 302, 304, and 306; a back-end system 330; and a network 310.

In some embodiments, the network 310 includes a local area network (LAN), wide area network (WAN), the Internet, or a combination thereof, and connects web sites, devices (e.g., the computing devices 302, 304, and 306) and back-end systems (e.g., the back-end system 330). In some embodiments, the network 310 includes the Internet, an internet, and/or extranet, or an intranet and/or extranet that is in communication with the Internet. In some embodiments, the network 310 includes a telecommunication and/or data network. In some embodiments, the network 310 can be accessed over a wired and/or a wireless communications link. For example, mobile computing devices (e.g., the smartphone device 302 and the tablet device 306), can use a cellular network to access the network 310.

In the depicted example environment 300, the back-end system 330 includes at least one server device 332 employing the described datapath offload chaining system and at least one data store 334. In some embodiments, the back-end system 330 may be deploy within a data center that provides services, such as a web service, the computing devices 302, 304, and 306. The described datapath offload chaining system may be employed within the example environment 300 to process chains of operations provided by the CPU of the at least one server device 332.

In some embodiments, the at least one server device 332 is sustainably similar to computing device 110 depicted in FIG. 1. In some embodiments, the at least one server device 332 is server-class hardware type devices. In some embodiments, back-end system 330 includes computer systems using clustered computers and components to act as a single pool of seamless resources when accessed through the network 310. For example, such implementations may be used in data center, cloud computing, storage area network (SAN), and network attached storage (NAS) applications. In some embodiments, back-end system 330 is deployed using a virtual machine(s).

In some embodiments, the data store 334 is a repository for persistently storing and managing collections of data. Example data stores include data repositories, such as a database as well as simpler store types, such as files, emails, and so forth. In some embodiments, the data store 334 includes a database. In some embodiments, a database is a series of bytes or an organized collection of data that is managed by a database management system (DBMS).

In some embodiments, the at least one server system 332 hosts one or more computer-implemented services with which users 322, 324, and 326 can interact using the respective computing devices 302, 304, and 306.

In some examples, the users 322, 324, and 326 interact with the services provided by the back-end system 330 through a graphical user interface (GUI) or application that is installed and executing on their respective computing devices 302, 304, and 306. In some examples, the computing devices 302, 304, and 306 provide viewing data to screens with which the users 322, 324, and 326 can interact. In some embodiments, the computing devices 302, 304, 306, and 332 are sustainably similar to computing device 110 depicted in FIG. 1. The computing devices 302, 304, 306 may each include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In the depicted example, the computing device 302 is a smartphone, the computing device 304 is a tablet-computing device, and the computing device 306 is a desktop computing device. Three user computing devices 302, 304, and 306, are depicted in FIG. 3 for simplicity. It is contemplated, however, that implementations of the present disclosure can be realized with any of the appropriate computing devices, such as those mentioned previously. Moreover, implementations of the present disclosure can employ any number of devices as required.

Figure 4:
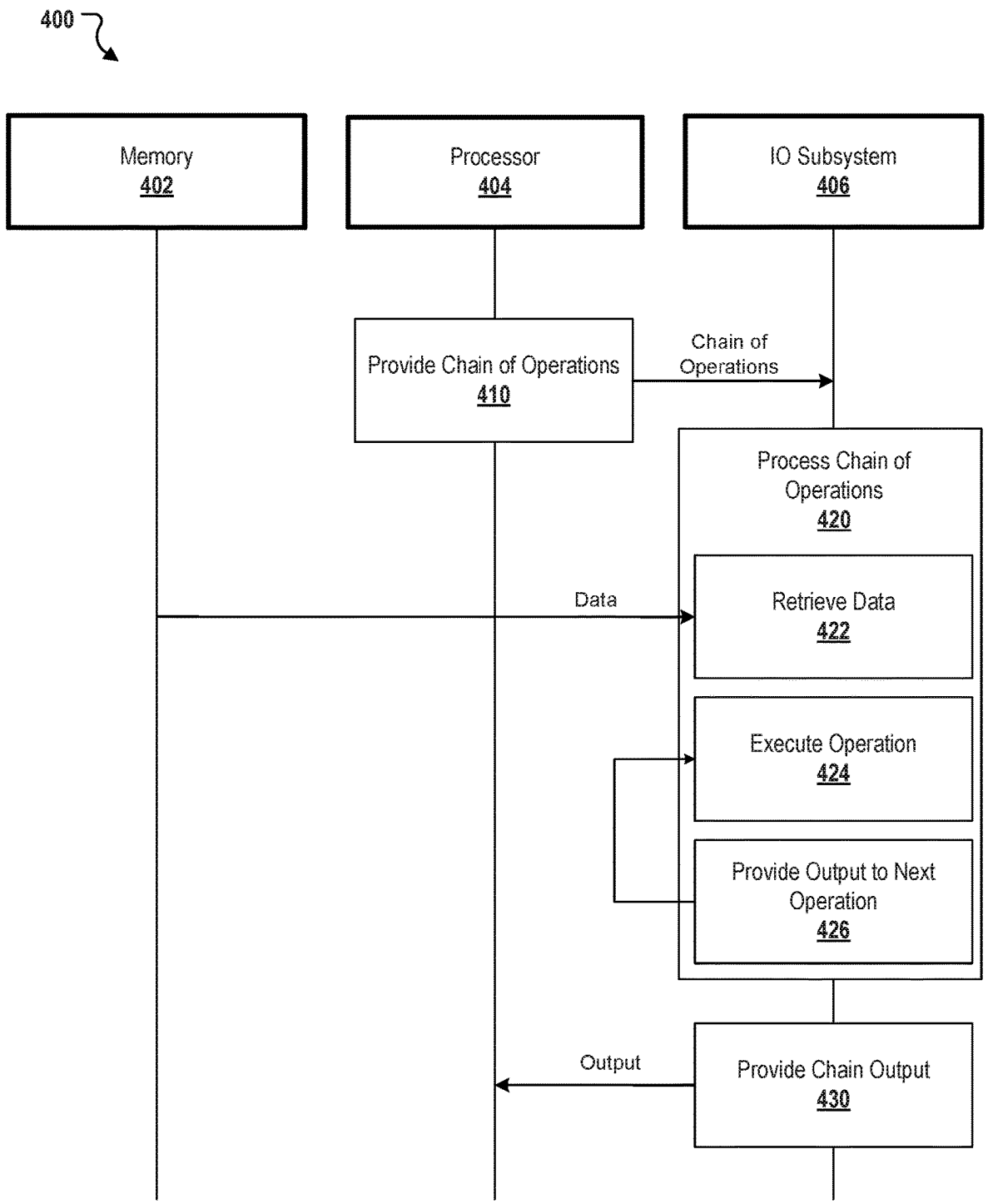
FIG. 4 depicts a flowchart of a non-limiting example process that can be implemented by embodiments of the present disclosure.

FIG. 4 depicts a flowchart of an example process 400. The example process 400 can be implemented by the various elements of the described datapath offload chaining system. As depicted, the example process shows in more detail that communication as well as the separation of work between a memory 402, one or more processors 404, and an IO subsystem 406. The flowchart generally shows how data and a chain of operations are processed to provide an output for the chain to the one or more processors 404. For clarity of presentation, the description that follows generally describes the example process 400 in the context of FIGS. 1-3. However, it will be understood that the process 400 may be performed, for example, by any other suitable system, environment, software, and hardware, or a combination of systems, environments, software, and hardware as appropriate. In some embodiments, various operations of the process 400 can be run in parallel, in combination, in loops, or in any order.

At 410, the one or more processors 404 provide a chain of operations to the IO subsystem 406. In some embodiments, the IO subsystem 406 is connected to the one or more processors 404 over PCIe. In some embodiments, the chain of operations comprises custom operations. In some embodiments, the chain of operations comprises previously defined operations. In some embodiments, the IO subsystem 406 comprises a programmable ASIC engine. In some embodiments, a datapath for the chain of operations is not hardwired into an ASIC design of the ASIC engine. In some embodiments, the ASIC engine allows flexible sharing of offloads between lookaside and inline datapaths. In some embodiments, the ASIC engine comprises a plurality of offload engines. In some embodiments, the offload engines include a checksum engine, a dedupe engine, a compression engine, or an encryption engine. In some embodiments, the IO subsystem 406 is configured to determine at least one of the offload engines to perform the execution of each of the operations. In some embodiments, each of the operations is executed by the respective at least one of the offload engines. In some embodiments, the offload engines are flexibly shared between the processing of the chain of operations and processing of other chains of operations. In some embodiments, the IO subsystem 406 comprises an expansion card. From 410, the process 400 proceeds to 420.

At 420, the IO subsystem 406 processes the chain of operations without involving the one or more processors 404 by performing steps 422, 424, and 426. In some embodiments, the IO subsystem 406 is configured to perform a transformation of the data according to the output of each of the operations. In some embodiments, the transformation comprises adding trailing data to the data. In some embodiments, the IO subsystem 406 is configured to process chains of operations independently. In some embodiments, the processing of one chain of operations is not blocked by another chain of operations that started early. From 420, the process 400 proceeds to 422.

At 422, the IO subsystem 406 retrieves from the memory 402, data associated with the chain of operations. In some embodiments, the data is retrieved from the memory 402 by the IO subsystem 406 only once for processing the chain of operations. In some embodiments, the data comprises at least one descriptor and the IO subsystem 406 is configured to, before providing the output of each the executed operations for execution of the respective next operation in the chain, update the at least one descriptor according to the output. In some embodiments, the at least one descriptor comprises a size descriptor for the data. In some embodiments, the output of at least one of the operations changes a size of the data. In some embodiments, the IO subsystem 406 is configured to update the size descriptor for the data based on the output of the at least one of the operations. In some embodiments, the IO subsystem comprises a local memory and is configured to persist the output determined for at least one of the operations in the chain to the local memory. In some embodiments, the IO subsystem is configured to retrieve the output stored to the local memory when executing the next operation in the chain. From 422, the process 400 proceeds to 424.

At 424, the IO subsystem 406 executes each of the operations in the chain to determine an output based on the data and output determined for any prior executed operation in the chain. In some embodiments, the chain of operations comprises a chain of first operations and a chain of second operations. In some embodiments, the IO subsystem 406 is configured to process the chain of first operations independently from the chain of second operations without any serialization or head-of-line blocking. In some embodiments, the data comprises a first set of data respective to the chain of first operations and a second set of data respective to the chain of second operations. In some embodiments, the IO subsystem 406 is configured to join the first set of data with the second set of data at some point during the processing of the chain of operations. In some embodiments, the chain of operations is dynamic and generated at runtime. From 424, the process 400 proceeds to 426.

At 426, the IO subsystem 406 provides the output of each the executed operations for execution (at 424) of the respective next operation in the chain. In some embodiments, the output for the chain of operations comprises an indication that the chain of operations has been processed and that the data has been updated according the output for each of the operations in the chain. From 426, the process 400 proceeds to 424 when the chain has more operations to process and to 430 when the operations in the chain have been executed.

At 430, the TO subsystem 406 provides an output for the chain of operations to the one or more processors 404. From 430, the process 400 ends.

Processing Devices and Processors

In some embodiments, the platforms, systems, media, and methods described herein include a computer, or use of the same. In further embodiments, the computer includes one or more hardware CPUs or general purpose graphics processing units (GPGPUs) that carry out the device's functions by providing chains of operation to an IO subsystem provided through a SmartNIC card connected to the CPU or GPGPU via PCIe. In still further embodiments, the computer comprises an operating system configured to perform executable instructions. In some embodiments, the computer is optionally connected a computer network. In further embodiments, the computer is optionally connected to the Internet such that it accesses the World Wide Web. In still further embodiments, the computer is optionally connected to a cloud computing infrastructure. In other embodiments, the computer is optionally connected to an intranet. In other embodiments, the computer is optionally connected to a data storage device.

In accordance with the description herein, suitable computers include, by way of non-limiting examples, server computers, desktop computers, laptop computers, notebook computers, sub-notebook computers, netbook computers, netpad computers, handheld computers, Internet appliances, mobile smartphones, tablet computers, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the computer is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, compact disc (CD)-Read only Memories (ROMs), Digital Versatile Disks (DVDs), flash memory devices, magnetic disk drives, magnetic tapes drives, optical disk drives, and cloud computing based storage. In further embodiments, the storage and/or memory device is a combination of devices such as those disclosed herein.

Non-transitory Computer Readable Storage Medium

In some embodiments, the platforms, systems, media, and methods disclosed herein include one or more non-transitory computer readable storage media encoded with a program including instructions executable by the operating system of an optionally networked computer. In further embodiments, a computer readable storage medium is a tangible component of a computer. In still further embodiments, a computer readable storage medium is optionally removable from a computer. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. In some embodiments, a computer program includes a sequence of instructions, executable in the computer's CPU, written to perform a specified task. Computer readable instructions may be implemented as program modules, such as functions, objects, API, data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A datapath offload chaining system, comprising:
a memory;
an input output (IO) subsystem comprising a plurality of offload engines and a local memory; and
one or more processors, wherein the IO subsystem is coupled to the one or more processors over Peripheral Component Interconnect Express (PCIe), the one or more processors configured to:
provide a chain of operations to the IO subsystem;
wherein the IO subsystem is configured to:
process the chain of operations without involving the one or more processors by:
retrieving, from the memory, data associated with the chain of operations, wherein the data comprises a size descriptor for the data; and
executing, by the plurality of offload engines, the operations in the chain, wherein each of the plurality of offload engines is dedicated for performing at least one operation in the chain, and a first offload engine from the plurality of offload engines is programmed to generate an output by executing the corresponding operation based on the i) data and ii) an intermediate result of a prior operation in the chain, wherein the intermediate result is retrieved from the local memory of the IO subsystem, wherein the plurality of offload engines are ordered and combined into a pipeline according to the chain of operations by:
performing a transformation of the data according to the intermediate result generated by a second offload engine from the plurality of offload engines to change a size of the data;
updating the size descriptor for the data based on the intermediate result when the intermediate result is indicative of a result of the change of the size of the data;
persisting the intermediate result to the local memory; and retrieving the intermediate result stored to the local memory when executing the corresponding operation by the first offload engine; and provide an output for the chain of operations to the one or more processors.

2. The datapath offload chaining system of claim 1, wherein the data is retrieved from the memory by the IO subsystem only once for processing the chain of operations.

3. The datapath offload chaining system of claim 1, wherein the chain of operations comprises custom operations.

4. The datapath offload chaining system of claim 1, wherein the chain of operations comprises previously defined operations.

5. The datapath offload chaining system of claim 1, wherein the IO subsystem comprises a programmable application-specific integrated circuit (ASIC) engine.

6. The datapath offload chaining system of claim 5, wherein a datapath for the chain of operations is not hard-wired into an ASIC design of the ASIC engine.

7. The datapath offload chaining system of claim 6, wherein the ASIC engine allows flexible sharing of offloads between lookaside and inline datapaths.

8. The datapath offload chaining system of claim 1, wherein the plurality of offload engines include a checksum engine, a dedupe engine, a compression engine, or an encryption engine.

9. The datapath offload chaining system of claim 1, wherein at least one of the plurality of offload engines is flexibly shared between the processing of the chain of operations and processing of other chains of operations.

10. The datapath offload chaining system of claim 9, wherein the at least one offload engine is shared by receiving offload requests in an orderly and atomic fashion without causing operation overwrite.

11. The datapath offload chaining system of claim 1, wherein the transformation comprises adding trailing data to the data.

12. The datapath offload chaining system of claim 1, wherein the chain of operations comprises a chain of first operations and a chain of second operations, and wherein the TO subsystem is configured to:

process the chain of first operations independently from the chain of second operations without any serialization or head-of-line blocking.

13. The datapath offload chaining system of claim 12, wherein the data comprises a first set of data respective to the chain of first operations and a second set of data respective to the chain of second operations, and wherein the TO subsystem is configured to:

join the first set of data with the second set of data at some point during the processing of the chain of operations.

14. The datapath offload chaining system of claim 12, wherein the IO subsystem is configured to further redirect from the middle of the chain of first operations to the chain of second operations based on the intermediate result.

15. The datapath offload chaining system of claim 1, wherein the chain of operations is dynamic and generated at runtime.

16. The datapath offload chaining system of claim 1, wherein the TO subsystem is configured to:

process chains of operations independently, wherein the processing of one chain of operations is not blocked by another chain of operations that started early.

17. The datapath offload chaining system of claim 1, wherein the output for the chain of operations comprises an indication that the chain of operations has been process and that the data has been updated according to the output for each of the operations in the chain.

18. The datapath offload chaining system of claim 1, wherein the TO subsystem comprises an expansion card.

19. A computer-implemented method for processing a chain of operations through an input output (TO) subsystem without central processing unit (CPU) involvement, the method comprising:

providing, via the CPU, the chain of operations to the IO subsystem, wherein the IO subsystem comprises a plurality of offload engines and a local memory and is coupled to the CPU over Peripheral Component Interconnect Express (PCIe);

processing, with the IO subsystem, the chain of operations by:

retrieving, from a memory coupled to the CPU, data associated with the chain of operations, wherein the data comprises a size descriptor for the data; and executing, by the plurality of offload engines, the operations in the chain, wherein each of the plurality of offload engines is dedicated for performing at least one operation in the chain, and a first offload engine from the plurality of offload engines is programmed to generate an output by executing the corresponding operation based on i) the data and ii) an intermediate result of a prior operation in the chain, wherein the intermediate result is retrieved from the local memory, wherein the plurality of offload engines are ordered and combined into a pipeline according to the chain of operations by:

performing a transformation of the data according to the intermediate result generated by a second offload engine from the plurality of offload engines to change a size of the data;

updating the size descriptor for the data based on the intermediate result when the intermediate result is indicative of a result of the change of the size of the data;

persisting the intermediate result to the local memory; and retrieving the intermediate result stored to the local memory when executing the corresponding operation by the first offload engine; and providing, via the IO subsystem, an output for the chain of operations to the CPU.

20. One or more non-transitory computer-readable storage media coupled to one or more processors and an input output (TO) subsystem, the IO subsystem comprising a plurality of offload engines and a local memory and coupled to the one or more processors over Peripheral Component Interconnect Express (PCIe); the one or more non-transitory computer-readable storage media having instructions stored thereon which, when executed by the one or more processors and the IO subsystem, cause the one or more processors and the IO subsystem to perform a method comprising:

providing, via the one or more processors, a chain of operations to the IO subsystem;

processing, with the IO subsystem, the chain of operations by:

retrieving, from a memory coupled to the CPU, data associated with the chain of operations, wherein the data comprises a size descriptor for the data; and executing, by the plurality of offload engines, the operations in the chain, wherein each of the plurality of offload engines is dedicated for performing at least one operation in the chain, and a first offload engine from the plurality of offload engines is programmed to generate an output by executing the corresponding operation based on i) the data and ii) an intermediate result of a prior operation in the chain, wherein the intermediate result is retrieved from the local memory, wherein the plurality of offload engines are ordered and combined into a pipeline according to the chain of operations by:

performing a transformation of the data according to the intermediate result generated by a second offload engine from the plurality of offload engines to change a size of the data;

updating the size descriptor for the data based on the intermediate result when the intermediate result is indicative of a result of the change of the size of the data;

persisting the intermediate result to the local memory; and retrieving the intermediate result stored to the local memory when executing the corresponding operation by the first offload engine; and providing, via the IO subsystem, an output for the chain of operations to the one or more processors.

\* \* \* \* \*

UNITED STATES PATENT AND TRADEMARK OFFICE
CERTIFICATE OF CORRECTION

PATENT NO. : 11,416,435 B2
APPLICATION NO. : 16/559381
DATED : August 16, 2022
INVENTOR(S) : Pirabhu Raman et al.

It is certified that error appears in the above-identified patent and that said Letters Patent is hereby corrected as shown below:

In the Specification

| | | |
|---|---|---|
| Column 4 | Line 5 | Delete "TO" and insert -- IO --, therefor. |
| Column 4 | Line 11 | Delete "TO" and insert -- IO --, therefor. |
| Column 4 | Line 17 | Delete "TO" and insert -- IO --, therefor. |
| Column 4 | Line 20 | Delete "TO" and insert -- IO --, therefor. |
| Column 4 | Line 23 | Delete "TO" and insert -- IO --, therefor. |
| Column 4 | Line 27 | Delete "TO" and insert -- IO --, therefor. |
| Column 4 | Line 35 | Delete "TO" and insert -- IO --, therefor. |
| Column 4 | Line 39 | Delete "TO" and insert -- IO --, therefor. |
| Column 4 | Line 41 (First occurrence) | Delete "TO" and insert -- IO --, therefor. |
| Column 4 | Line 41 (Second occurrence) | Delete "TO" and insert -- IO --, therefor. |
| Column 4 | Line 42 | Delete "TO" and insert -- IO --, therefor. |
| Column 4 | Line 49 | Delete "TO" and insert -- IO --, therefor. |
| Column 4 | Line 52 | Delete "TO" and insert -- IO --, therefor. |

Signed and Sealed this
Fourteenth Day of February, 2023

*Katherine Kelly Vidal*

Katherine Kelly Vidal
*Director of the United States Patent and Trademark Office*

CERTIFICATE OF CORRECTION (continued)
U.S. Pat. No. 11,416,435 B2

| | | |
|---|---|---|
| Column 14 | Line 49 | Delete "TO" and insert -- IO --, therefor. |

In the Claims

| | | |
|---|---|---|
| Column 17 | Line 41 | In Claim 12, delete "TO" and insert -- IO --, therefor. |
| Column 17 | Line 50 | In Claim 13, delete "TO" and insert -- IO --, therefor. |
| Column 17 | Line 61 | In Claim 16, delete "TO" and insert -- IO --, therefor. |
| Column 18 | Line 4 | In Claim 18, delete "TO" and insert -- IO --, therefor. |
| Column 18 | Line 6 | In Claim 19, delete "(TO)" and insert -- (IO) --, therefor. |
| Column 18 | Line 48 | In Claim 20, delete "(TO)" and insert -- (IO) --, therefor. |